$3,043,819$
2-(PYRAZOL)ETHYL ACRYLATES, PROCESS FOR THEIR PRODUCTION, AND POLYMERIZATION PRODUCTS THEREOF
John W. Lynn, Charleston, W. Va., assignor to Union Carbide Corporation, a corporation of New York
No Drawing. Filed Sept. 15, 1959, Ser. No. 839,995
10 Claims. (Cl. 260—88.3)

This invention relates to novel unsaturated esters as new compositions of matter, to processes for their production, and to the polymerization of such compositions.

The novel unsaturated esters of this invention can be graphically depicted by the formula:

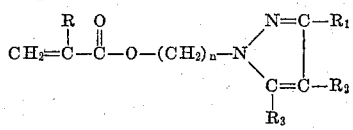

wherein R is a member selected from the group consisting of hydrogen and methyl radicals, $R_1$, $R_2$ and $R_3$ are members selected from the group consisting of hydrogen, lower alkyl and phenyl radicals, and $n$ is an integer having a value of from 1 to 2. By the term "lower alkyl" as used throughout this specification is meant an alkyl radical having from 1 to 6 carbon atoms, inclusively. Illustrative of the novel unsaturated esters of this invention is 2-(3,5-dimethylpyrazol-1-yl)ethyl acrylate which can be represented by the formula:

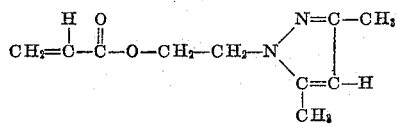

and such compounds as (3,5-dimethylpyrazol-1-yl)methyl acrylate,
2-(3,5-diethylpyrazol-1-yl)ethyl acrylate,
2-(3,5-dihexylpyrazol-1-yl)ethyl methacrylate,
2-(3,5-diphenylpyrazol-1-yl)ethyl methacrylate,
(3,5-diphenylpyrazol-1-yl)methyl methacrylate,
2-(3-ethyl-5-methylpyrazol-1-yl)ethyl acrylate,
(3-ethyl-5-methylpyrazol-1-yl)methyl acrylate,
2-(3-butyl-5-phenylpyrazol-1-yl)ethyl methacrylate,
(3-butyl-5-phenylpyrazol-1-yl)methyl methacrylate,
2-(pyrazol-1-yl)ethyl acrylate,
(pyrazol-1-yl)methyl methacrylate and the like.

The novel unsaturated esters of this invention can be produced by the transesterification of a suitable unsaturated ester with a hydroxyalkyl-substituted pyrazole compound.

The unsaturated esters which can be employed as starting materials can be graphically depicted by the formula:

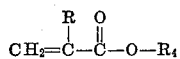

wherein R is as above defined, and $R_4$ is a lower alkyl radical. Illustrative of such starting materials are such compounds as methyl acrylate, methyl methacrylate, ethyl acrylate, ethyl methacrylate, isopropyl acrylate, isopropyl methacrylate, n-hexyl acrylate, n-hexyl methacrylate, and the like. Such materials are well known and can be produced in accordance with customary procedures.

The hydroxyalkyl-substituted pyrazole compounds which can be employed in the transesterification of the above-described ester starting materials can be graphically depicted by the formula:

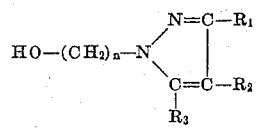

wherein $R_1$, $R_2$, $R_3$ and $n$ are as above defined. Illustrative of such compounds is 3,5-dimethyl-1-(2-hydroxyethyl)pyrazole which can be represented by the formula:

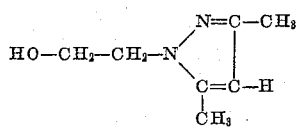

and such materials as 3,5-dimethyl-1-(hydroxymethyl)pyrazole,
3,5-diethyl-1-(2-hydroxyethyl)pyrazole,
3,5-dihexyl-1-(2-hydroxyethyl)pyrazole,
3,5-diphenyl-1-(2-hydroxyethyl)pyrazole,
3,5-diphenyl-1-(hydroxymethyl)pyrazole,
3-ethyl-5-methyl-1-(2-hydroxyethyl)pyrazole,
3-ethyl-5-methyl-1-(hydroxymethyl)pyrazole,
3-butyl-5-phenyl-1-(2-hydroxyethyl)pyrazole,
3-butyl-5-phenyl-1-(hydroxymethyl)pyrazole,
1-(2-hydroxyethyl)pyrazole,
1-(hydroxymethyl)pyrazole and the like.

The hydroxyalkyl-substituted pyrazole compounds which can be employed in the transesterification of the esters employed as starting materials in the process of the instant invention can be prepared in various ways. By way of illustration, hydroxyethyl-substituted pyrazole compounds can be prepared by the reaction of ethylene oxide with pyrazole, or a substituted derivative thereof. Thus, for example, 3,5-dimethyl-1-(2-hydroxyethyl)pyrazole can be prepared by heating a mixture of ethylene oxide and 3,5-dimethylpyrazole. This can be illustrated by the following graphic equation:

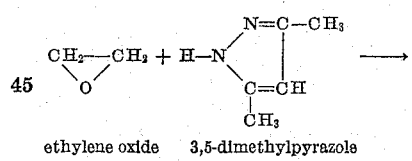

ethylene oxide   3,5-dimethylpyrazole

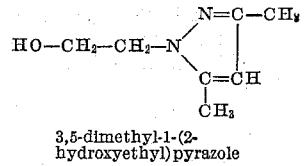

3,5-dimethyl-1-(2-hydroxyethyl)pyrazole

In like manner, ethylene oxide can be reacted with various other pyrazole compounds to produce a wide variety of hydroxyethyl-substituted pyrazole compounds useful in the process of the instant invention.

The hydromethyl-substituted pyrazole compounds which can be employed in the transesterification of the esters employed as starting materials in the process of the instant invention can be prepared by the reaction of formaldehyde with pyrazole, or a suitable substituted derivative thereof. By way of illustration, 3,5-dimethyl-1-(hydroxymethyl)pyrazole can be prepared by heating a mixture of formaldehyde and 3,5-dimethylpyrazole at a temperature of from about 30° C. to about 100° C.

This can be illustrated by the following graphic equation:

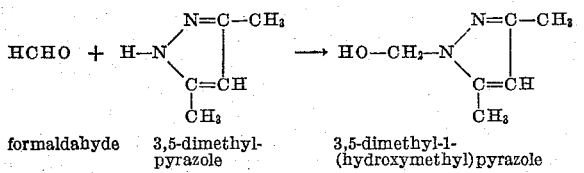

formaldehyde    3,5-dimethyl-    3,5-dimethyl-1-
                pyrazole         (hydroxymethyl)pyrazole In like manner, formaldehyde can be reacted with various other pyrazole compounds to produce a wide variety of hydroxymethyl-substituted pyrazole compounds useful in the process of the instant invention.

The transesterification of unsaturated esters with hydroxyalkyl-substituted pyrazole compounds according to the process of the instant invention can be illustrated by the following graphic equation:

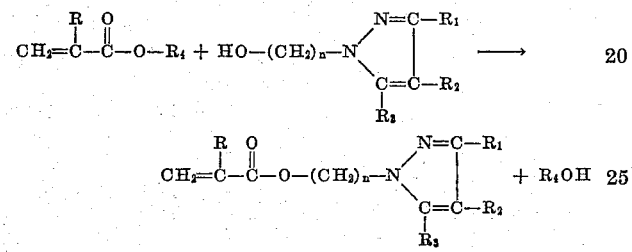

wherein R, $R_1$, $R_2$, $R_3$, $R_4$ and $n$ are as above defined. Thus, for example, 2-(3,5-dimethylpyrazol-1-yl)ethyl acrylate can be prepared by the reaction of ethyl acrylate with 3,5-dimethyl-1-(2-hydroxyethyl)pyrazole.

When effecting the transesterification of an unsaturated ester with a hydroxyalkyl-substituted pyrazole compound according to the process of the instant invention it is preferable to employ a substantial excess of the unsaturated ester starting material over the stoichiometric amount required to react with the hydroxyalkyl-substituted pyrazole compound present in order to help drive the reaction to completion. Amounts of unsaturated ester starting material of from 5 to 10 times the stoichiometric equivalent are preferred for this purpose, but amounts of from as little as 1 mole to as much as 20 moles per mole of hydroxyalkyl-substituted pyrazole compound present can also be employed; however, when an amount of unsaturated ester starting material which is less than 5 times the stoichiometric equivalent is employed, the yield of the desired reaction product is correspondingly lowered.

The transesterification of an unsaturated ester with a hydroxyalkyl-substituted pyrazole compound according to the process of the instant invention is promoted by and preferably effected in the presence of a transesterification catalyst. Metal alkoxides, such as the alkoxides of aluminum, titanium, calcium and magnesium, are effective transesterification catalysts. The alkoxy radicals present in such alkoxides can, of course, be the same or different. Preferably such alkoxy radicals contain no more than 8 carbon atoms. Specific examples of the catalysts which can be employed include such compounds as magnesium diethylate, calcium dibutylate, titanium tetrabutylate, titanium tetraisopropylate, aluinum trimethylate, aluminum trioctylate and the like.

The catalyst employed in promoting the transesterification of an unsaturated ester with a hydroxyalkyl-substituted pyrazole compound according to the process of the instant invention can be employed in an amount of from as low as 0.1 percent by weight to as high as 5 percent by weight, preferably from 0.5 percent by weight to 2 percent by weight, of the combined weight of reactants employed.

The transesterification of an unsaturated ester with a hydroxyalkyl-substituted pyrazole compound according to the process of the instant invention readily occurs, at temperatures ranging from as low as 60° C. to as high as 160° C., but is preferably effected at temperatures ranging from about 80° C. to about 120° C.

Atmospheric pressure is usually employed in effecting the transesterification of an unsaturated ester with a hydroxyalkyl-substituted pyrazole compound according to the process of the instant invention. However, pressure both above and below atmospheric pressure, for example pressures ranging from as low as 200 mm. Hg to as high as 1000 p.s.i., can also be employed whenever it is desirable to do so.

The transesterification of an unsaturated ester with a hydroxyalkyl-substituted pyrazole compound according to the process of the instant invention may be effected in an insert liquid solvent. By an "inert liquid solvent" is meant a liquid solvent in which the starting materials are soluble to an extent whereby they are brought into reactive contact and which itself is nonreactive under the conditions of the reaction. Suitable inert liquid solvents which can be employed include hydrocarbons such as hexane, cyclohexane, heptane, benzene, toluene and the like, ethers such as dioxane, tetrahydrofuran and the like, and ketones such as acetone and the like. In general, an amount of solvent ranging from 0 to 10 times, preferably from 0 to 2 times, the weight of reactants present can be effectively employed.

The novel unsaturated esters of this invention find wide use in the preparation of polymeric materials. Thus, such compounds, because of the vinyl group present therein, can be readily homopolymerized, or copolymerized with certain vinyl-containing organic compounds, such as styrene, butadiene, methyl acrylate, methyl methacrylate, vinyl chloride, vinylidene chloride, acrylonitrile, methacrylonitrile, vinylidene cyanide, acrylamide, methacrylamide, vinyl methyl ether and the like. The polymeric materials produced by polymerizing the novel unsaturated esters of this invention are useful in forming films, fibers and coatings.

Polymerization of the novel unsaturated esters of this invention can be effected by conventional means. For example, polymerization can be effected by means of heat, light, or a suitable vinyl polymerization catalyst, such as a peroxide or azo compound. Preferably polymerization is effected by heating in the presence of a polymerization catalyst in order to shorten the reaction time. Temperatures ranging from as low as 0° C. to as high as 100° C. are generally effective for this purpose. Among the peroxides which can be employed as catalysts may be mentioned hydrogen peroxide, barium peroxide, magnesium peroxide, diethyl peroxide, distearyl peroxide, acetyl peroxide, stearoyl peroxide and acetyl benzoyl peroxide. Specific examples of the azo compounds which can be employed include $\alpha,\alpha'$-azodiisobutyronitrile and 2,2'-dicyanoazobenzene.

If desired, the novel unsaturated esters of this invention can be polymerized from an emulsion or from a solution of the starting monomer. Good results are obtained by effecting polymerization in an inert liquid diluent such as acetonitrile, benzene, toluene, xylene, and the like.

The copolymers obtained by copolymerizing the novel unsaturated esters of this invention generally contain from as low as 1 molar percent to as high as 50 molar percent of combined ester.

The following examples are set forth for purposes of illustration so that those skilled in the art may better understand this invention, and it should be understood that they are not to be construed as limiting this invention in any manner.

EXAMPLE 1

*Preparation of 3,5-Dimethyl-1-(2-Hydroxyethyl)Pyrazole*

To 96 grams (1 mole) of 3,5-dimethylpyrazole maintained at a temperature of 110–120° C. were added 47 grams (1.1 moles) of ethylene oxide. The resulting mixture was then heated at a temperature of about 120° C.

for 5 hours. At the end of this time, the mixture was distilled under reduced pressure and 115 grams of 3,5-dimethyl-1-(2-hydroxyethyl)pyrazole boiling at a temperature of 92° C. at 1.6 mm. Hg pressure were collected. This represented a yield of about 82 percent of theoretical. This material had a melting point of 57° C. and was identified by chemical analysis. *Analysis.*—Calcd. for $C_7H_{12}N_2O$: N, 20.00%. Found: N, 19.59%.

EXAMPLE 2

*Preparation of 2-(3,5-Dimethylpyrazol-1-yl)Ethyl Acrylate*

An admixture of 70 grams (0.5 mole) of 3,5-dimethyl-1-(2-hydroxyethyl)pyrazole, 250 grams (2.5 moles) of ethyl acrylate, 0.5 gram of an antioxidant (phenyl-beta-naphthylamine), and 6 grams of titanium tetrabutylate was prepared and refluxed over a three hour period while an azeotrope of ethanol and ethyl acrylate was removed therefrom by distillation. Following this, most of the titanium tetrabutylate catalyst present in the mixture was removed therefrom by extraction with 100 ml. of a saturated aqueous solution of sodium citrate. After the extraction procedure was completed, solid particles present in the mixture were removed therefrom by filtration. Excess ethyl acrylate and volatile by-products of the transesterification reaction present in the mixture were removed therefrom by distilling the mixture at a temperature of 80° C. at 5 mm. Hg pressure. The remaining residue was then distilled through a falling film evaporator. About 68 grams of distillate, boiling at a temperature of 110° C. at 0.01 mm. Hg pressure, were collected. The distillate had an index of refraction of 1.4870 at 30° C. Titration of the distillate with perchloric acid showed its composition to be 95.5 percent 2-(3,5-dimethylpyrazol-1-yl)-ethyl acrylate. This represented an overall yield of 71 percent of theoretical. The product was further identified by its infrared absorption spectrum and chemical analysis. *Analysis.*—Calculated for $C_{10}H_{14}N_2O_2$: C, 61.8%; H, 7.21%; N, 14.43%. Found: C, 61.87%; H, 7.63%; N, 14.29%.

EXAMPLE 3

*Polymerization of 2-(3,5-Dimethylpyrazol-1-yl)Ethyl Acrylate*

To a Pyrex glass tube were charged 10 grams (0.05 mole) of 2-(3,5-dimethylpyrazol-1-yl)ethyl acrylate, 15 grams of acetonitrile, and 0.5 ml. of acetyl peroxide. The tube was then sealed and rotated at a rate of about 45 r.p.m. for four and one-quarter hours in a bath maintained at a temperature of 50° C. Upon cooling, the tube was opened and isopropyl ether was added to the contents thereof and the precipitate obtained thereby was washed with isopropyl ether and dried by heating at a temperature of 70° C. for 24 hours. About 6.15 grams of polymer were recovered in this manner. This represented a yield of about 61.5 percent of theoretical. The polymer had a reduced viscosity of 0.45 in cyclohexanone.

Reduced viscosity ($I_R$) is a measure of the molecular weight of a polymer, and may be defined by the equation:

$$I_R = \frac{\frac{\Delta N}{N_0}}{C}$$

wherein $\Delta N$ is the difference in seconds between the flow-time of a solution of polymer through a capillary viscometer and the flow-time of the solvent, $N_0$ represents the flow-time of the solvent, and C is the concentration of polymer in said solution in grams per 100 ml. of solution. Measurements were made at 30° C. using cyclohexanone as solvent, and a solution of 0.2 gram of polymer per 100 ml. of solution.

Unless otherwise specified, all parts and percentages, as used throughout this specification, are by weight.

What is claimed is:

1. The unsaturated esters represented by the general formula:

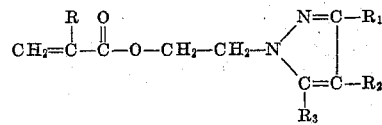

wherein R is a member selected from the group consisting of hydrogen and methyl radicals, and $R_1$, $R_2$ and $R_3$ are members selected from the group consisting of hydrogen and lower alkyl radicals.

2. 2-(3,5-dimethylpyrazol-1-yl)ethyl acrylate.

3. A process for producing unsaturated esters represented by the general formula:

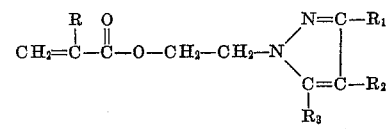

wherein R is a member selected from the group consisting of hydrogen and methyl radicals, and $R_1$, $R_2$ and $R_3$ are members selected from the group consisting of hydrogen, lower alkyl and phenyl radicals, which comprises forming a mixture of an unsaturated ester represented by the general formula:

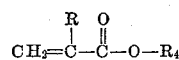

wherein R is as above defined and $R_4$ is a lower alkyl radical, and a hydroxyethyl-substituted pyrazole compound represented by the general formula:

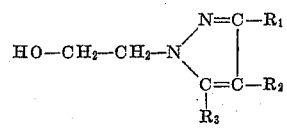

wherein $R_1$, $R_2$ and $R_3$ are as above defined, and heating the mixture at an elevated temperature.

4. A process for producing unsaturated esters represented by the general formula:

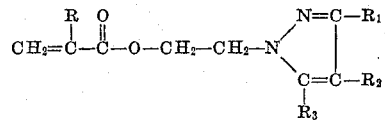

wherein R is a member selected from the group consisting of hydrogen and methyl radicals, and $R_1$, $R_2$ and $R_3$ are members selected from the group consisting of hydrogen, lower alkyl and phenyl radicals, which comprises forming a mixture of an unsaturated ester represented by the general formula:

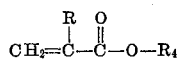

wherein R is as above defined and $R_4$ is a lower alkyl radical, a hydroxyethyl-substituted pyrazole compound represented by the general formula:

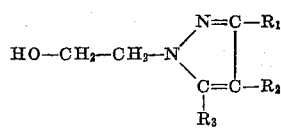

wherein $R_1$, $R_2$ and $R_3$ are as above defined, and a transesterification catalyst, there being present in said mixture from five to ten times the stoichiometric amount of the unsaturated ester starting material required to react with the hydroxyethyl-substituted pyrazole compound employed as starting material, and heating the mixture at an elevated temperature.

5. A process for producing 2-(3,5-dimethylpyrazol-1- yl)ethyl acrylate which comprises forming a mixture of 3,5-dimethyl-1-(2-hydroxyethyl)pyrazole, ethyl acrylate, and a transesterification catalyst, and heating the mixture at an elevated temperature.

6. A process as in claim 5 wherein the transesterification catalyst is titanium tetrabutylate.

7. A process for producing 2-(3,5-dimethylpyrazol-1-yl)ethyl acrylate which comprises forming a mixture of 3,5-dimethyl-1-(2-hydroxyethyl)pyrazole, ethyl acrylate, and a transesterification catalyst, there being present in said mixture from five to ten times the stoichiometric amount of ethyl acrylate required to react with the 3,5-dimethyl-1-(2-hydroxyethyl)pyrazole employed as starting material, and heating the mixture at an elevated temperature.

8. A process as in claim 7 wherein the transesterification catalyst is titanium tetrabutylate.

9. A normally solid homopolymer of 2-(3,5-dimethylpyrazol-1-yl)-ethyl acrylate.

10. A process for producing a homopolymer of 2-(3,5-dimethylpyrazol-1-yl)ethyl acrylate which comprises forming a mixture of 2-(3,5-dimethylpyrazol-1-yl)ethyl acrylate and a free radical vinyl polymerization catalyst, and heating the mixture to cause homopolymerization of said 2-(3,5-dimethylpyrazol-1-yl)ethyl acrylate.

References Cited in the file of this patent
UNITED STATES PATENTS

| | | |
|---|---|---|
| 2,643,990 | Ham et al. | June 30, 1953 |
| 2,883,392 | Karmas et al. | Apr. 21, 1959 |

UNITED STATES PATENT OFFICE
CERTIFICATE OF CORRECTION

Patent No. 3,043,819

July 10, 1962

John W. Lynn

It is hereby certified that error appears in the above numbered patent requiring correction and that the said Letters Patent should read as corrected below.

Column 1, line 11, for "n w" read -- new --; column 2, line 60, for "hydromethyl-substituted" read -- hydroxymethyl-substituted --; column 3, line 62, for "aluinum" read -- aluminum --; column 4, line 14, for "insert" read -- inert --.

Signed and sealed this 13th day of November 1962.

(SEAL)
Attest:

ERNEST W. SWIDER
Attesting Officer

DAVID L. LADD
Commissioner of Patents